United States Patent
Dyck et al.

(10) Patent No.: US 11,428,259 B2
(45) Date of Patent: Aug. 30, 2022

(54) SHEAR COUPLING AND METHOD OF ASSEMBLING SAME

(71) Applicant: Plainsman Mfg. Inc., Edmonton (CA)

(72) Inventors: Tyler J. Dyck, Edmonton (CA); Shane T. Mcassey, Ardrossan (CA); Mark A. Lea-Wilson, Edmonton (CA)

(73) Assignee: Plainsman Mfg. Inc., Edmonton (CA)

( * ) Notice: Subject to any disclaimer, the term of this patent is extended or adjusted under 35 U.S.C. 154(b) by 75 days.

(21) Appl. No.: 16/881,042

(22) Filed: May 22, 2020

(65) Prior Publication Data
US 2021/0301857 A1 Sep. 30, 2021

(30) Foreign Application Priority Data

Mar. 30, 2020 (CA) .................... CA 3077491

(51) Int. Cl.
*F16B 31/02* (2006.01)
*E21B 17/046* (2006.01)
(Continued)

(52) U.S. Cl.
CPC .......... *F16B 31/021* (2013.01); *E21B 17/046* (2013.01); *E21B 17/06* (2013.01); *E21B 41/00* (2013.01); *E21B 43/121* (2013.01)

(58) Field of Classification Search
CPC ....... E21B 17/06; E21B 17/046; F16B 31/021
See application file for complete search history.

(56) References Cited

U.S. PATENT DOCUMENTS

| 195,408 A | 9/1877 | Shaw |
| 1,348,692 A | 8/1920 | Bell |

(Continued)

FOREIGN PATENT DOCUMENTS

| CA | 1298715 | 4/1992 |
| CA | 2334926 | 12/1999 |

(Continued)

OTHER PUBLICATIONS

Balasubramaniam, Mahadevan et al., "An Anti-Backlash Two-Part Shaft Coupling with Interlocking Elastically Averaged Teeth," Department of Mechanical Engineering, Massachusetts Institute of Technology Cambridge, Massachusetts, 2002, pp. 1-28.

(Continued)

*Primary Examiner* — Jonathan Malikasim
(74) *Attorney, Agent, or Firm* — Nixon & Vanderhye P.C.

(57) ABSTRACT

A shear coupling can be used with reciprocating and rotary pumps. The shear coupling uses a shear nut and connecting member as the shear element. The connecting member and shear nut are located inside the axial bore of the shear coupling to protect from corrosive wellbore elements. The coupling members may be connected by matching polygonal shaft and hub profiles on the coupling members to transmit torque. The shaft and hub may have octagonal profiles for better torque transmission capacity. The shear nut may be isolated from large alternating stresses due to pretensioning of the connecting member. The length of the connecting member, especially when pretensioned, and a reduced cross-section that may be formed on the outer surface of the shear coupling increase the overall flexibility of the shear coupling, thereby increasing the resistance to bending stress.

22 Claims, 11 Drawing Sheets

(51) Int. Cl.
    *E21B 41/00* (2006.01)
    *E21B 43/12* (2006.01)
    *E21B 17/06* (2006.01)

(56) References Cited

U.S. PATENT DOCUMENTS

| | | | |
|---|---|---|---|
| 1,610,414 A * | 12/1926 | Bernard | E21B 17/06 |
| | | | 285/330 |
| 2,059,175 A | 10/1936 | Myracle | |
| 2,074,430 A | 3/1937 | Reed | |
| 2,876,993 A | 3/1959 | Hooks | |
| 2,889,162 A | 6/1959 | Norris | |
| 3,089,429 A | 5/1963 | Massey | |
| 3,168,873 A | 2/1965 | Huckaby | |
| 3,809,162 A | 5/1974 | Sydor | |
| 4,186,570 A | 2/1980 | Pokrandt | |
| 4,311,194 A | 1/1982 | White | |
| 4,411,546 A | 10/1983 | Fischer | |
| 4,422,508 A | 12/1983 | Rutledge, Jr. et al. | |
| 4,653,953 A | 3/1987 | Anderson et al. | |
| 4,674,525 A | 6/1987 | Richards et al. | |
| 4,913,229 A | 4/1990 | Hearn | |
| 5,086,844 A | 2/1992 | Mims et al. | |
| 5,141,053 A | 8/1992 | Restarick et al. | |
| 5,211,226 A | 5/1993 | Hendrickson et al. | |
| 5,330,239 A | 7/1994 | Blose et al. | |
| 5,348,086 A | 9/1994 | Trout | |
| 5,413,180 A | 5/1995 | Ross et al. | |
| 5,498,035 A | 3/1996 | Blose et al. | |
| 5,662,341 A | 9/1997 | Ezell et al. | |
| 6,315,044 B1 | 11/2001 | Tinker | |
| 6,625,851 B1 | 9/2003 | Martin et al. | |
| 7,237,617 B2 | 7/2007 | Howlett | |
| 7,513,537 B2 | 4/2009 | Mosing et al. | |
| 7,628,213 B2 | 12/2009 | Telfer | |
| 7,654,345 B1 | 2/2010 | Keck | |
| 8,251,161 B2 | 8/2012 | Dithmar et al. | |
| 8,636,057 B2 | 1/2014 | Wolodko et al. | |
| 8,997,849 B2 | 4/2015 | Lea-Wilson et al. | |
| 9,273,534 B2 | 3/2016 | Merron et al. | |
| 9,605,493 B2 | 3/2017 | Lauder et al. | |
| 9,605,510 B2 | 3/2017 | Grainger | |
| 9,663,999 B2 | 5/2017 | Lea-Wilson et al. | |
| 9,803,449 B2 | 10/2017 | Good, III et al. | |
| 9,840,890 B2 | 12/2017 | Nordheimer | |
| 10,221,633 B2 * | 3/2019 | Wollmann | E21B 17/1071 |
| 10,669,799 B2 * | 6/2020 | Massey | E21B 17/06 |
| 2004/0149449 A1 | 8/2004 | Morrison et al. | |
| 2004/0202521 A1 | 10/2004 | Bostik | |
| 2005/0183248 A1 | 8/2005 | Gallant et al. | |
| 2005/0194143 A1 | 9/2005 | Xu et al. | |
| 2006/0278388 A1 | 12/2006 | Zanca et al. | |
| 2008/0066901 A1 | 3/2008 | Gereluk | |
| 2009/0202316 A1 | 8/2009 | Petri Larrea | |
| 2009/0271966 A1 | 11/2009 | Fotty et al. | |
| 2011/0150596 A1 | 6/2011 | Wolodko et al. | |
| 2011/0266005 A1 | 11/2011 | Hult et al. | |
| 2015/0368989 A1 | 12/2015 | Lauder et al. | |
| 2019/0010768 A1 * | 1/2019 | Cosse | E21B 43/126 |

FOREIGN PATENT DOCUMENTS

| | | |
|---|---|---|
| CA | 2232925 | 4/2003 |
| CA | 2688801 | 6/2011 |
| CA | 2760149 | 2/2013 |
| CA | 2855128 | 12/2015 |
| CN | 2192762 | 3/1995 |
| WO | WO 2011/075326 | 6/2011 |
| WO | WO 2017/171725 | 10/2017 |

OTHER PUBLICATIONS

Coupling Bolts Image from https://www.slideshare.net/MohammudHanifDewan/sterntubeandshaftingarrangements, May 3, 2017, 1 page.

Han, Chuanjun et al., "Structure Design and Stress Analysis of Hollow Sucker Rod Joints," Applied Mechanics and Materials, vols. 1657-158, 2012, pp. 1199-1203.

"Shear Couplings" Brochure from plainsman mfg. inc., May 2000, 2 pp.

"Shear Couplings" Brochure from Hawkeye Industries Inc., May 2011, 1 page.

"Sucker Rod Shear Coupling" Brochure from Hawkeye Industries Inc., Jul. 2010, 1 page.

"Taper Lock Tooling System" Brochure from United Drill Busing Corporation, Nov. 1998, 6 pp.

* cited by examiner

SHEAR COUPLING AND METHOD OF ASSEMBLING SAME

CROSS-REFERENCES TO RELATED APPLICATIONS

This application claims the benefit of Canadian Patent Application No. 3,077,491, filed Mar. 30, 2020, the entire content of which is herein incorporated by reference.

STATEMENT REGARDING FEDERALLY SPONSORED RESEARCH OR DEVELOPMENT

NOT APPLICABLE

TECHNICAL FIELD

The present application relates generally to couplings, and more particularly relates to shear couplings for connecting downhole components of a well string.

BACKGROUND

In a well producing oil or gas, a downhole pump is connected to the surface by a rod string. There are situations where it is desirable to remove the rod string from the wellbore without removing the downhole pump, for example where the pump becomes stuck in the wellbore. In order to remove the rod string without removing the downhole pump, a shear coupling may be connected to the rod string downhole at or near the pump, and an axial pulling force is applied to the rod string at the surface to break the shear coupling. The shear coupling is typically designed to break at a pre-set axial load.

Conventional shear couplings may have shear pins extending transversely into the two coupled members of the shear coupling acting as the shear element, which break upon the application of a pre-set axial force. Alternatively, previously known shear couplings may utilize a shear neck of reduced diameter, a wire lock, or grooves formed on the shear coupling itself as the shear element.

Many of these conventional shear couplings perform well in applications where the primary forces experienced by the shear coupling are axial. However, in current downhole production, shear couplings are subjected to a combination of axial, torsional, and bending stresses, especially in deviated wellbores. The additional stresses may cause conventional shear couplings to fatigue or even fail, causing the shear element to unexpectedly break at a lower axial load than desired, leading to potential interruptions to wellbore production. This is particularly the case where the shear element itself is a stress concentrator, such as a groove or shear neck formed on the shear coupling.

Additionally, many of the conventional shear couplings are not designed for use with both rotary and reciprocating downhole pumps, as they do not have an adequate torque transmission connection between the coupling members, causing the torsional stress to be experienced primarily by the shear element.

There is an ongoing need in the industry for a shear coupling that is resistant to the axial, bending, and torsional stresses experienced downhole, which can be used with both rotary and reciprocating downhole pumps, and which protects the shear element of the coupling from the corrosive environment of the wellbore.

SUMMARY OF THE DISCLOSURE

The present disclosure provides a flexible shear coupling that can be used in both reciprocating and rotary pump applications. The shear coupling of the present disclosure uses a shear nut and connecting member as the shear element, with the shear nut axially engaging a shoulder formed within an axial bore of the shear coupling. The connecting member and shear nut are located inside the axial bore of the shear coupling to protect them from corrosive wellbore elements. The coupling members may be connected by a polygonal shaft profile on one coupling member and matching polygonal hub profile on the other coupling member to transmit torque in a rotary application. In one embodiment, the shaft and hub may have matching octagonal profiles to increase the contact surface area for better torque transmission capacity and to reduce slippage.

Unlike many previously known shear elements, the shear nut of the present disclosure does not present a stress concentrator for the shear coupling. In one embodiment, the shear nut is isolated from large alternating stresses due to pretensioning of the connecting member. The length of the connecting member, especially when pretensioned, and a reduced cross-section that may be formed on the outer surface of the shear coupling increase the overall flexibility of the shear coupling, thereby making the shear coupling more resistant to bending stress.

The shear coupling of the present disclosure is assembled by connecting the driving elements of the coupling members, which may be the polygonal shaft and matching hub profiles. The connecting member and the shear nut may then be inserted into an axial bore formed through at least one of the coupling members. The shear nut axially engages a shoulder within the axial bore. The shear nut also radially supports the connecting member. In a preferred embodiment, this occurs by threading the shear nut onto the connecting member. In alternative embodiments, the shear nut may radially support the connecting member by being formed integrally with the connecting member, or by sliding over an unthreaded portion of the connecting member.

The coupling members are then operatively connected together. This may be accomplished in a number of different ways, including by threadedly connecting the connecting member to a threaded portion of the axial bore, or by forming the connecting member as part of one of the coupling members and securing it to the shear nut. In a preferred embodiment, once the shear coupling is assembled, the connecting member may then be pretensioned.

According to one aspect, there is provided a shear coupling for connecting downhole components of a well string, the shear coupling comprising: first and second coupling members driveably engageable with each other, at least one of the coupling members having an axial bore formed therethrough with a shoulder formed within the axial bore, a shear nut axially engageable with the shoulder, and a connecting member disposably receivable within the axial bore, the connecting member being radially supportable by the shear nut and configurable to operatively connect the first and second coupling members.

In one embodiment of this aspect, the connecting member may be formed as part of one of the coupling members.

In another embodiment of this aspect, the shear nut may comprise a shear washer and a nut.

In another embodiment of this aspect, the shear nut and the connecting member may be formed as a single piece.

In another embodiment of this aspect, the shear nut may be configured to break upon the application of a pre-set axial load to the shear coupling.

In another embodiment of this aspect, at least part of at least one of the first and second coupling members may have a reduced cross-section formed on its outer surface.

In another embodiment of this aspect, the driveable engagement between the first and second coupling members may be a polygonal shaft profile on one of the coupling members and a matching polygonal hub profile on the other coupling member.

In another embodiment of this aspect, wherein the matching polygonal profiles may be octagonal.

In another embodiment of this aspect, an end of the connecting member may be extendable into the axial bore beyond the length of the polygonal hub profile.

In another embodiment of this aspect, an end of the connecting member may be extendable into the axial bore beyond the length of the polygonal shaft profile.

In another embodiment of this aspect, the well string may comprise a reciprocating pump.

In another embodiment of this aspect, the well string may comprise a rotary pump.

In another embodiment of this aspect, the connecting member may be pretensioned.

In another embodiment of this aspect, an engagement between the first and second coupling members may provide a radial seal for the axial bore.

In another embodiment of this aspect, the first and second coupling members may each further comprise tapered shoulders that may be engageable with each other when the coupling members are driveably engaged.

According to a further aspect, there is provided a method of assembling a shear coupling comprising first and second coupling members, a connecting member, and a shear nut, the method comprising the steps of: driveably connecting the first and second coupling members, inserting the connecting member and the shear nut into an axial bore formed through at least one of the coupling members such that the shear nut is axially engaged with a shoulder formed within the axial bore and radially supporting the connecting member, and operatively connecting the coupling members together.

In one embodiment of this aspect, the method may further comprise the step of pretensioning the connecting member.

In another embodiment of this aspect, the driveable connection between the first and second coupling members may provide a radial seal for the axial bore.

In another embodiment of this aspect, the first and second coupling members may be driveably connected with a transition fit.

In another embodiment of this aspect, the first and second coupling members may each further comprise tapered shoulders that may be engaged with each other when the coupling members are driveably connected.

DETAILED DESCRIPTION

The present disclosure relates to a shear coupling and method of assembling same. The shear coupling can be used with reciprocating and rotary pumps. The shear coupling uses a shear nut and connecting member as the shear element. The connecting member and shear nut are located inside the axial bore of the shear coupling to protect from corrosive wellbore elements. The coupling members may be connected by matching polygonal shaft and hub profiles on the coupling members to transmit torque. The shaft and hub may have octagonal profiles for better torque transmission capacity. The shear nut may be isolated from large alternating stresses due to pretensioning of the connecting member. The length of the connecting member, especially when pretensioned, and a reduced cross-section that may be formed on the outer surface of the shear coupling increase the overall flexibility of the shear coupling, thereby increasing the resistance to bending stress.

Figure 1:
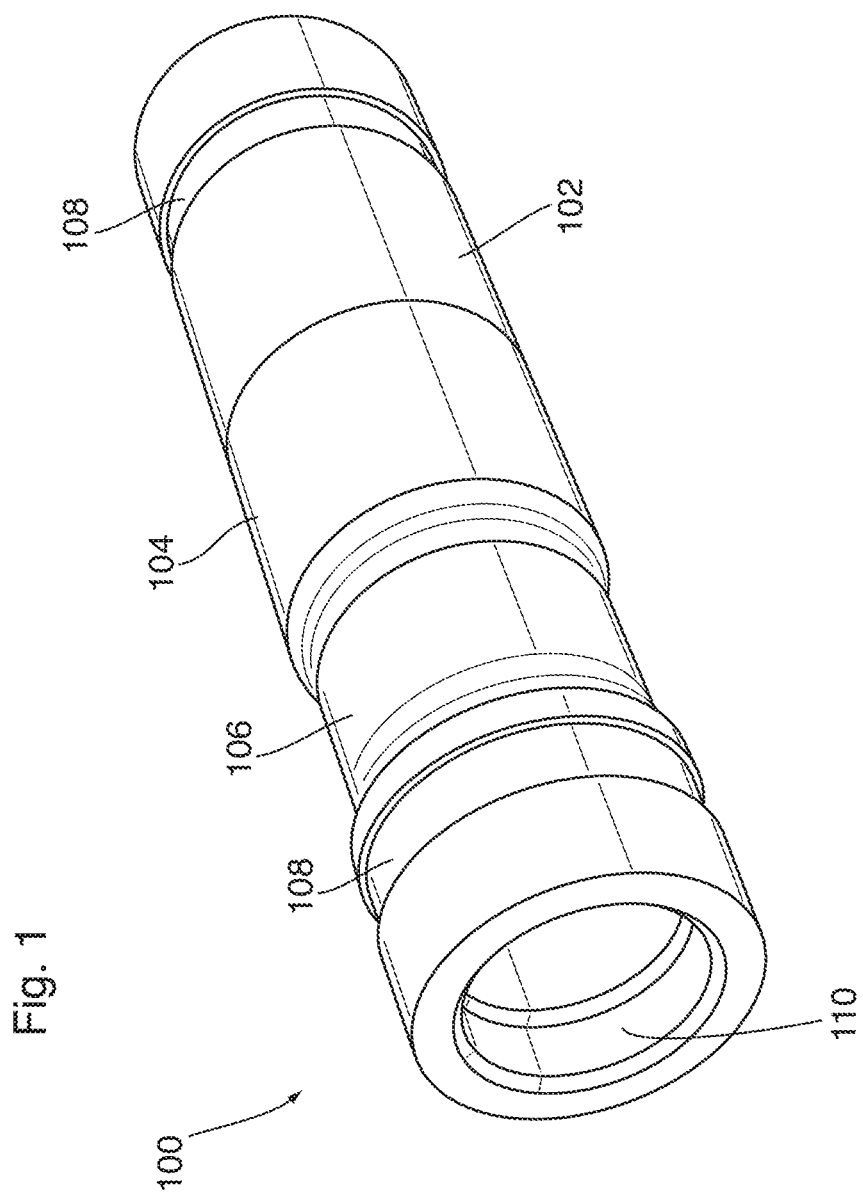
FIG. 1 is a perspective view of a shear coupling assembled in accordance with an embodiment of the disclosure.

Referring to FIG. 1, an embodiment of a shear coupling 100 is provided in assembled form. Although the shear coupling 100 is shown in assembled form in FIG. 1, individual components of the shear coupling 100 may be packaged together or separately for assembly at a wellsite.

Figure 2:
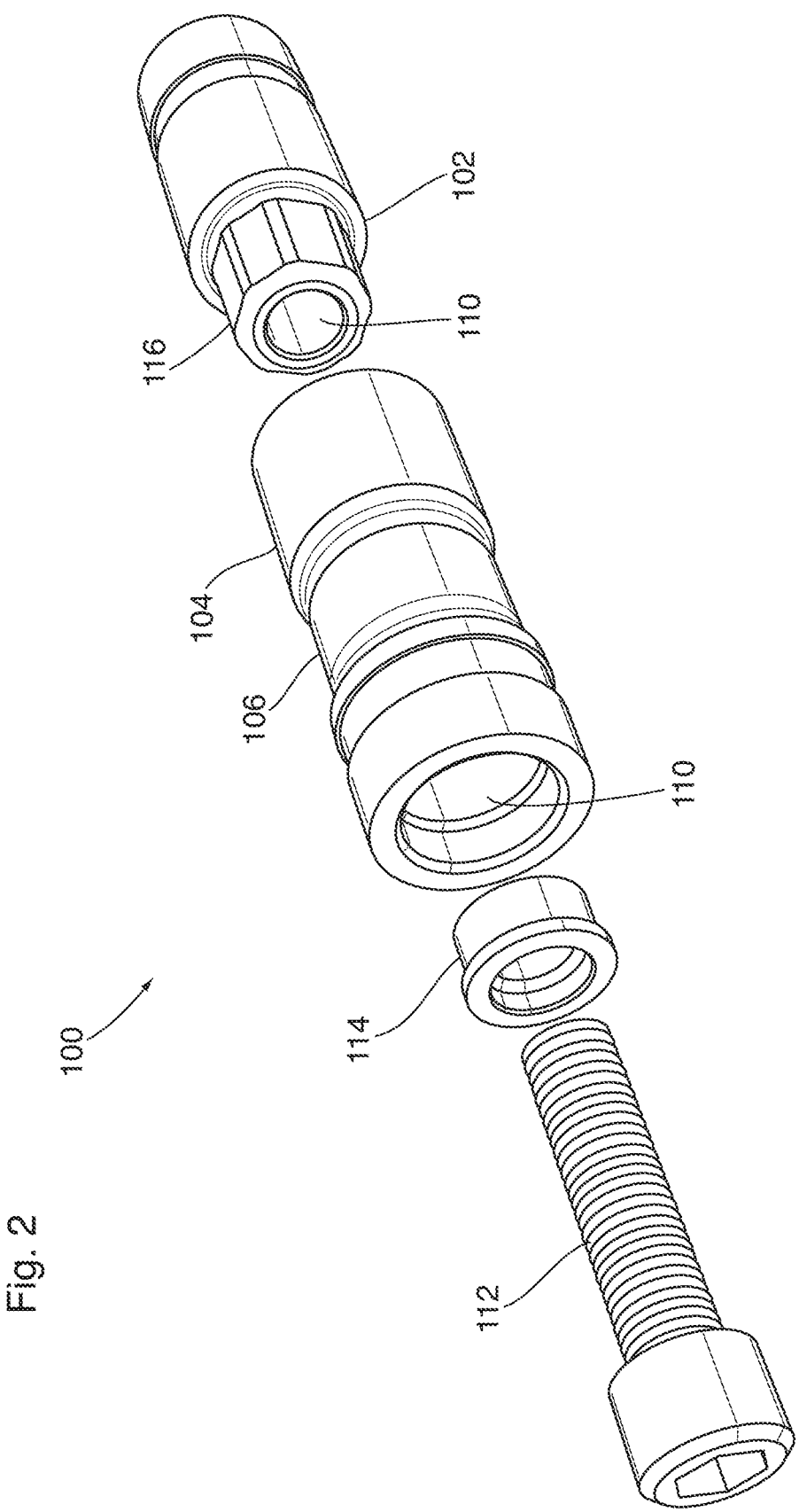
FIG. 2 is a perspective exploded view of the shear coupling of FIG. 1.
Figure 3:
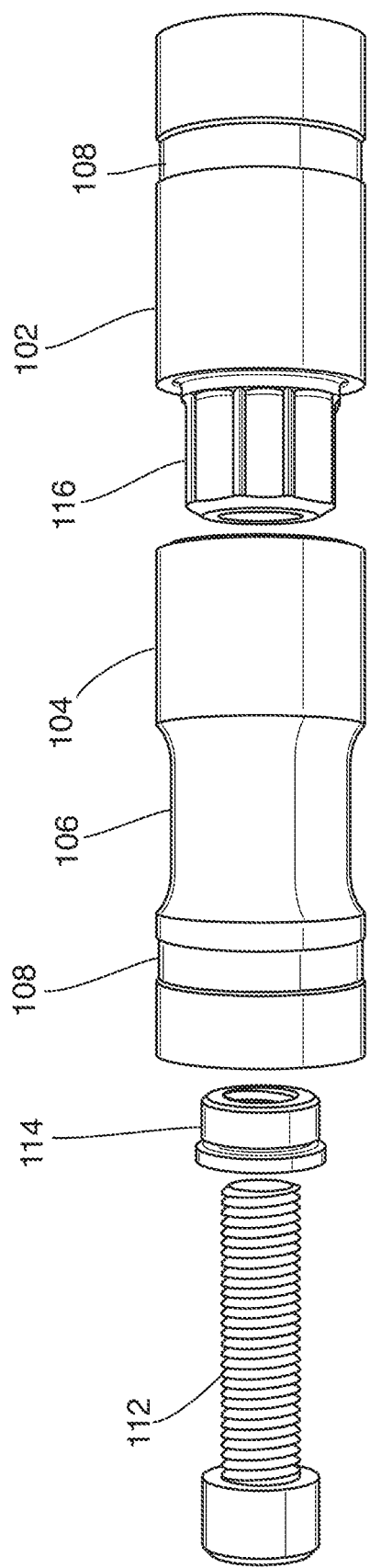
FIG. 3 is a side elevational exploded view of the shear coupling of FIG. 1.

An exploded view showing the components of the shear coupling 100 is shown in FIGS. 2 and 3. The shear coupling 100 comprises a first coupling member 102, a second coupling member 104, a bolt 112, and a shear nut 114. In this embodiment, the bolt 112 acts as the connecting member. As seen in FIGS. 1 and 2, in the preferred embodiment, an axial bore 110 extends through the first coupling member 102 and the second coupling member 104. However, as the skilled person will appreciate, the axial bore 110 does not need to extend through the entire shear coupling 100. In an alternative embodiment, the coupling member receiving the connecting member may have a blind hole to receive the connecting member. In a further alternative embodiment, shown in FIGS. 10 and 11 and described in further detail below, an integral connecting member 144 may be formed on the end of the coupling member 102, so there is no bore formed through the coupling member 102.

The shear coupling 100 may also have a reduced cross-section 106 formed on its outer surface. In the preferred embodiment shown in FIGS. 1-5, the reduced cross-section 106 is formed on the outer surface of the second coupling member 104. However, a reduced cross-section 106 could be formed on either or both of the outer surfaces of the first coupling member 102 and the second coupling member 104.

The reduced cross-section 106 is a portion of the shear coupling 100 that has a smaller outer cross-section than the rest of the shear coupling 100. However, as the skilled person will appreciate, the reduced cross-section 106 does not act as a stress concentration point. Instead, the reduced cross-section 106 increases the overall flexibility of the shear coupling 100 and increases its resistance to bending stresses.

As shown in FIGS. 1-3, the shear coupling 100 may have one or more ID bands 108 formed on its outer diameter, on one or more of the first coupling member 102 and second coupling member 104. The purpose of the ID band 108 is to provide a location for the manufacturer to stamp identifying information, such as the name of the manufacturer, the serial number of the product, the shear rating, etc. The ID band 108 is sufficiently narrow and shallow as to not provide an appreciable stress concentration point on the outer diameter of the shear coupling 100.

Figure 4:
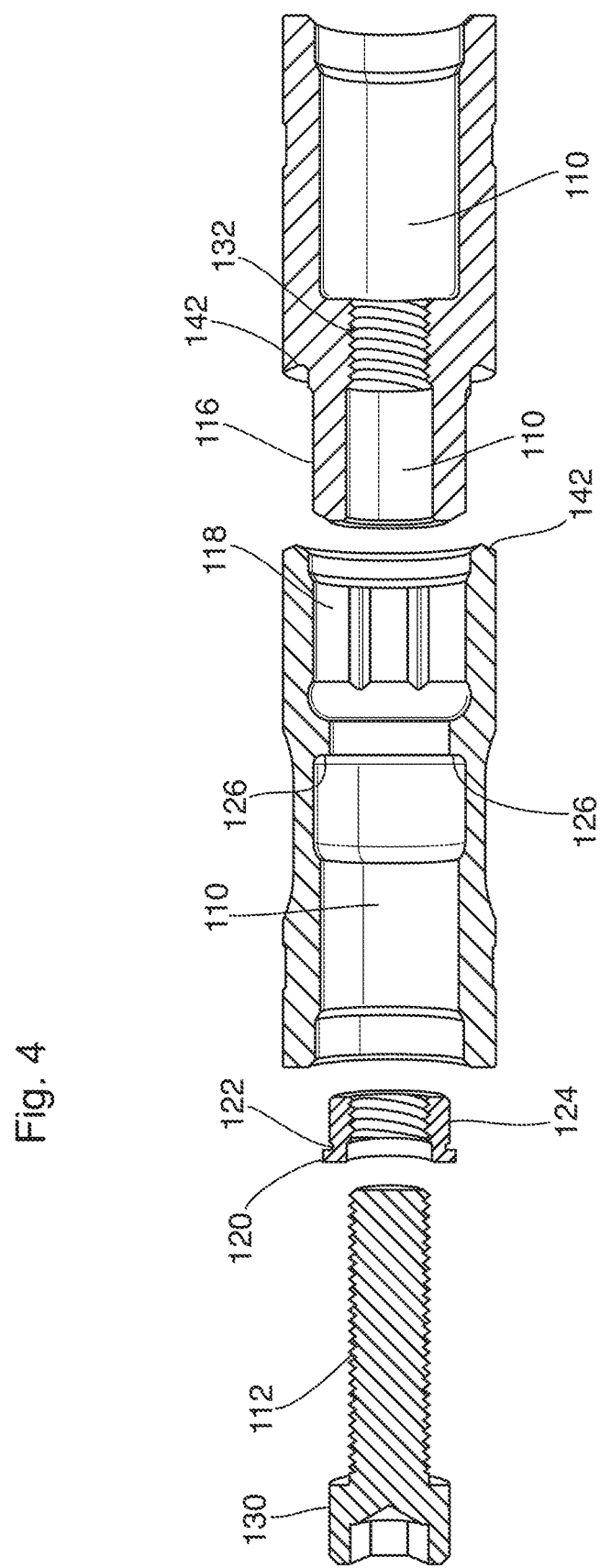
FIG. 4 is a cross-sectional view of the shear coupling of FIG. 3.
Figure 5:
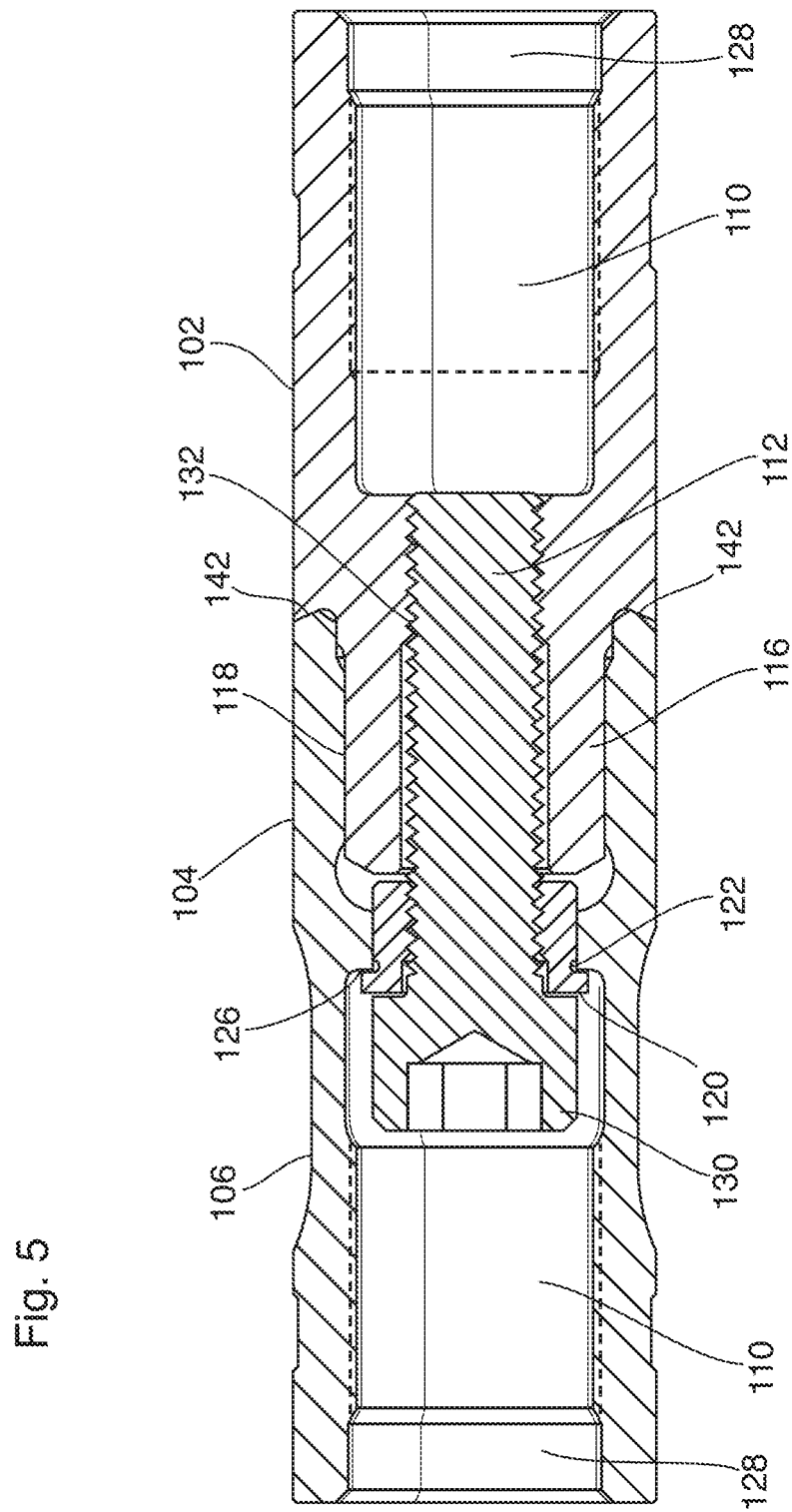
FIG. 5 is a side elevational cross-sectional view of a shear coupling assembled in accordance with an embodiment of the disclosure.

As shown in FIGS. 2-4, the first coupling member 102 may comprise a male driving engagement member 116 at one end to connect with the second coupling member 104. In the preferred embodiment shown in FIGS. 2-4, the male driving engagement member 116 is an octagonal shaft profile, and it driveably engages with a matching female driving engagement member 118 formed in the second coupling member 104, which in the preferred embodiment is an octagonal hub profile (FIGS. 4-5). The skilled person will appreciate that any driving engagement members 116 and 118 can be used, including other polygonal profiles, a spline profile, a key and keyway, interlocking finger joints, etc.

The octagonal shaft profile 116 and hub profile 118 provide a number of contact surfaces for driving engagement, which contributes to the torque capacity of the shear coupling 100, as well as reducing the risk of the driving engagement members 116 and 118 slipping relative to each other when in use, which could lead to an imbalance and additional stresses being placed on the shear coupling 100.

The first and second coupling members 102 and 104 may also comprise tapered shoulders 142. In a preferred embodiment, the taper on the shoulders 142 is approximately 20°. The tapered shoulders 142 centralize the connection between the driving engagement members 116 and 118, and are able to transmit torque through friction in the embodiment where the connecting member is pretensioned. In this embodiment, the tapered shoulders 142 are able to transmit more torque than flat shoulders at the same level of pretensioning. The tapered shoulders 142 also provide resistance to bending stress.

As seen in FIGS. 3-5, the bolt 112 may be threaded for connection to the shear nut 114 and a connecting portion 132 of the first coupling member 102. In an alternative embodiment, the bolt 112 may be threadedly connected to the second coupling member 104, or to both the first coupling member 102 and the second coupling member 104. The skilled person will also appreciate that there are other known methods to connect a bolt to a borehole, and that those methods are contemplated within the scope of the present disclosure.

Figure 10:
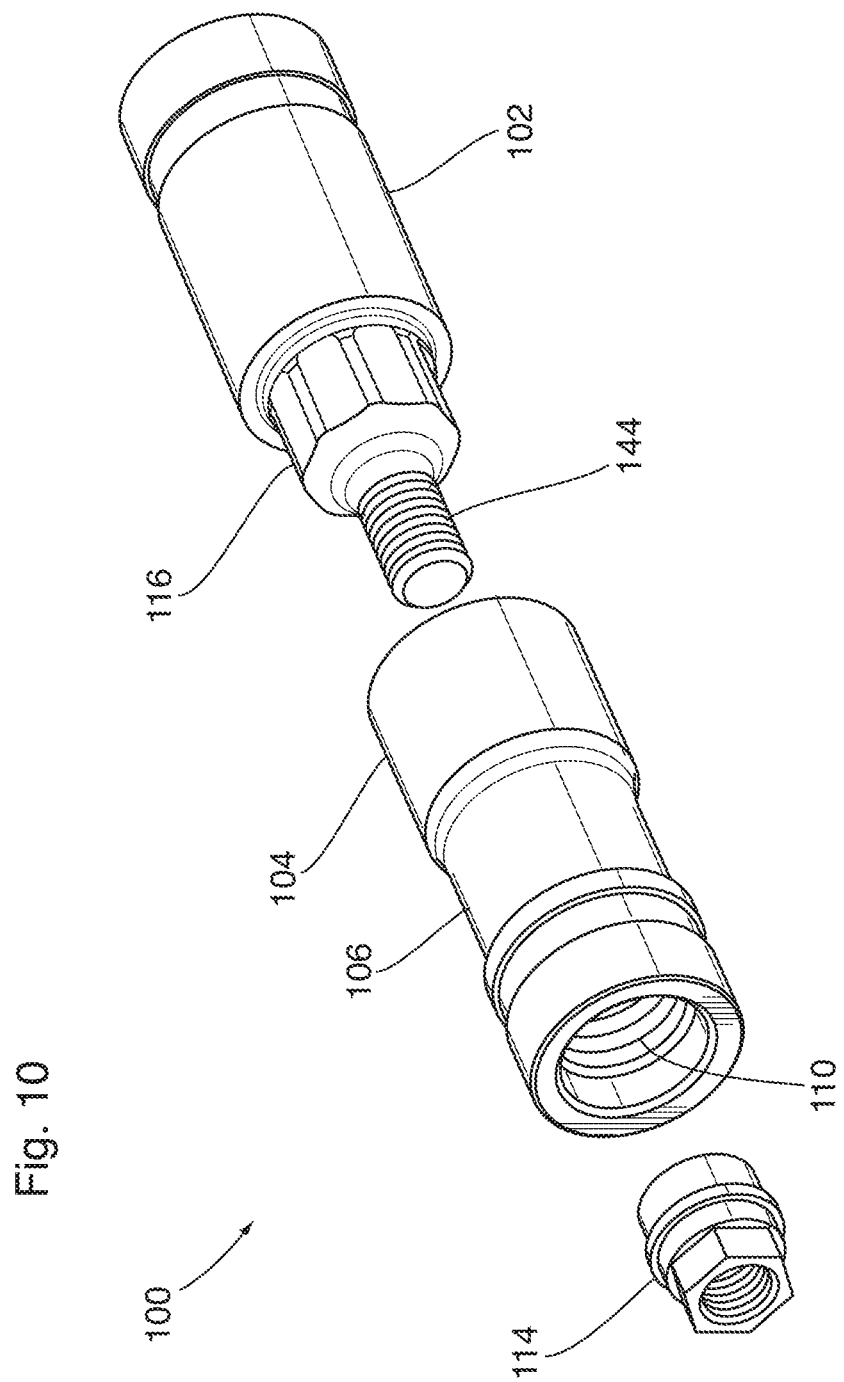
FIG. 10 is a perspective exploded view of a shear coupling in accordance with an alternative embodiment of the disclosure.
Figure 11:
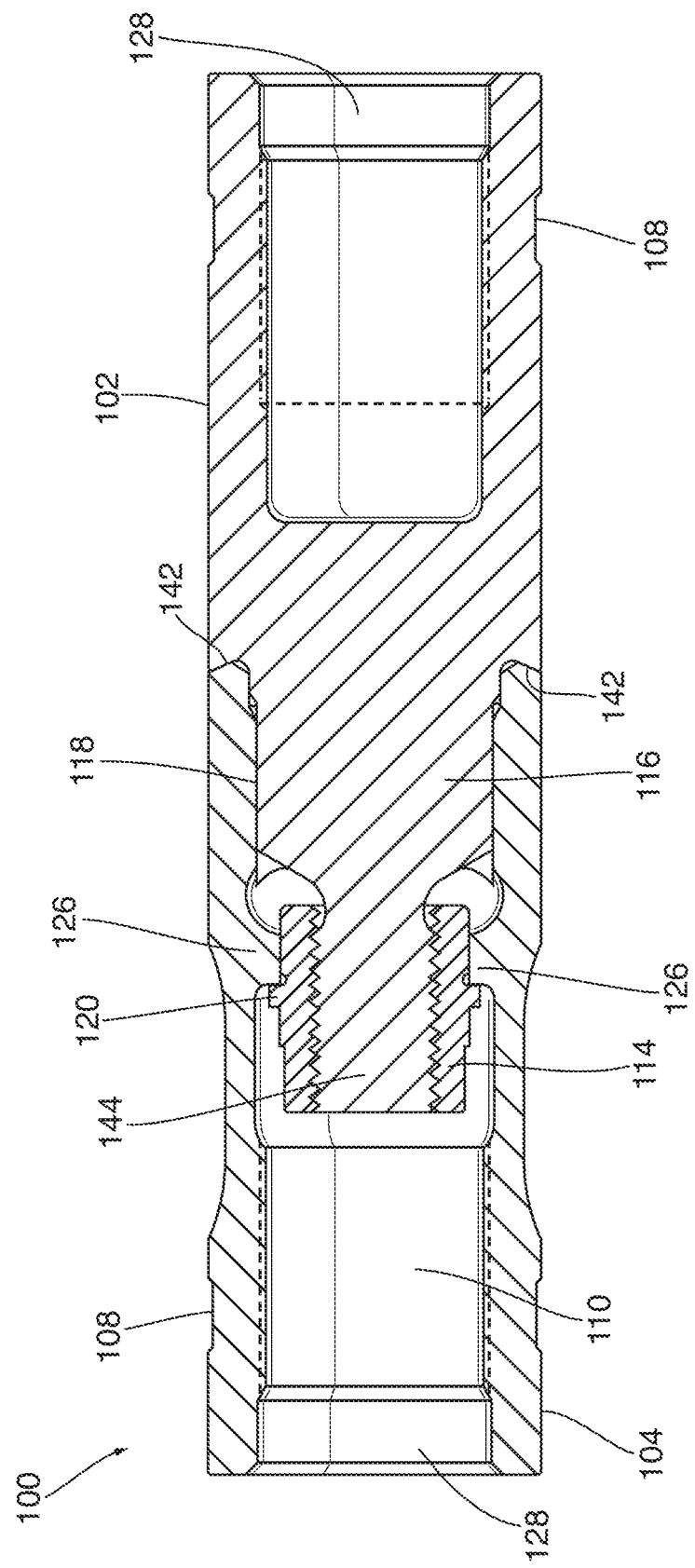
FIG. 11 is a side elevational cross-sectional view of a shear coupling assembled in accordance with the alternative embodiment of FIG. 10.

In a further alternative embodiment, the bolt 112 is not threadedly connected to the axial bore 110. In this embodiment, another nut may be threaded onto the end of the connecting member to clamp the coupling members 102 and 104 together. Alternatively, as shown in FIGS. 10 and 11, an integral connecting member 144 may be formed as part of one of the coupling members, which can engage with the shear nut 114 to clamp the shear coupling 100 together.

As shown in FIG. 4, in a preferred embodiment, the shear nut 114 comprises a body 124, a flange 120, and may also include a groove 122 formed on the outer surface of the body 124 below the flange 120. As shown in FIG. 5, when the shear coupling 100 is assembled, one side of the flange 120 is axially engaged with a shoulder 126 formed in the axial bore 110 of the shear coupling 100. The groove 122 may be formed on the outer surface of the body 124 to allow the shoulder 126 to engage with a flat surface on the flange 120, while eliminating the stress concentration of a sharp corner between the flange 120 and the body 124.

In one embodiment, the other side of the flange 120 may be axially engaged with the head 130 of the bolt 112. The shear nut 114 may also be threaded onto the connecting member, or connected to the connecting member in any other suitable manner known to the skilled person, such that the connecting member is radially supported by the shear nut 114. In some embodiments, particularly where less than the entire length of the bolt 112 is threaded, the shear nut 114 may slide onto the bolt 112 until one side of the flange 120 is axially engaged with the head 130.

Figure 6:
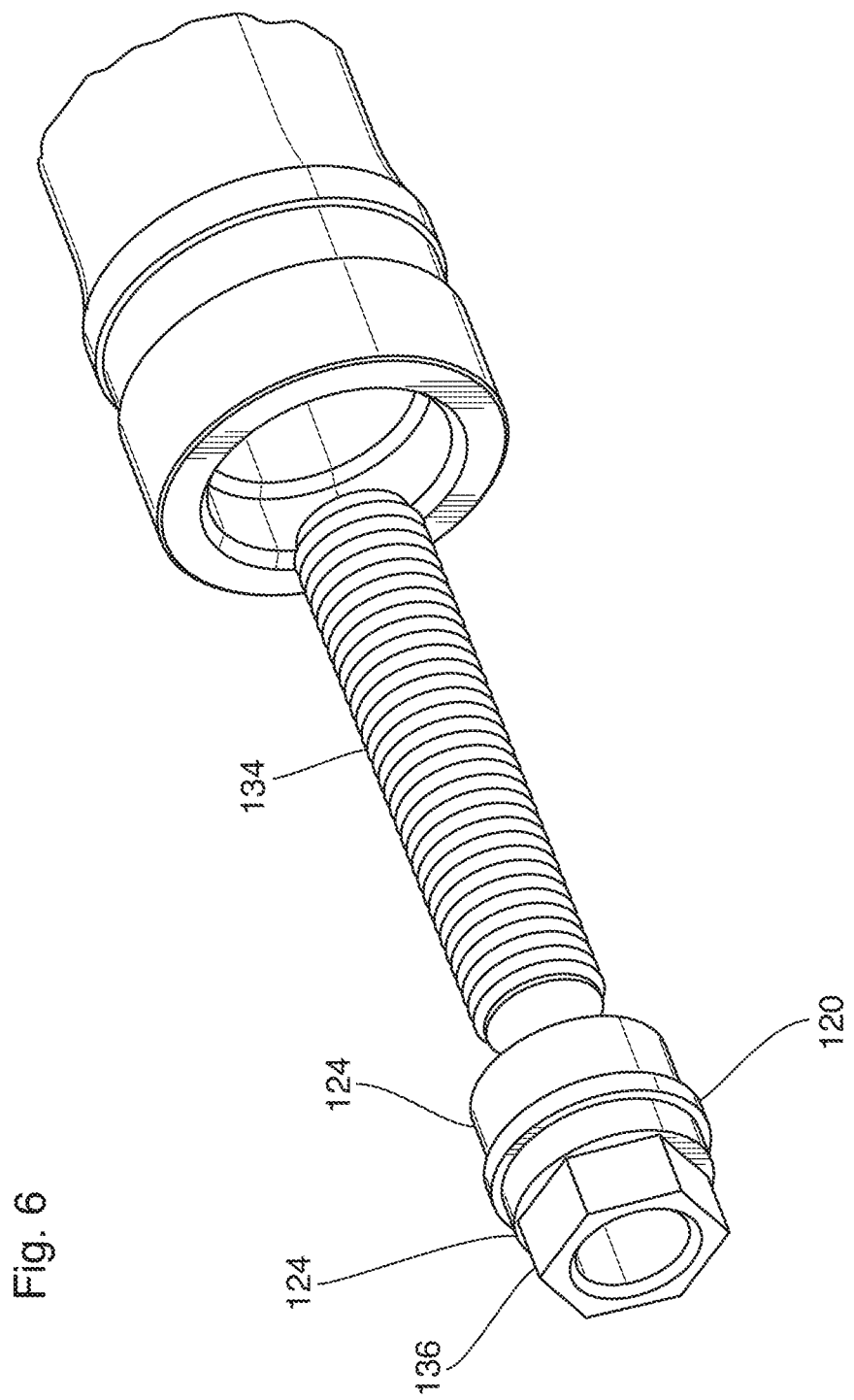
FIG. 6 is a perspective exploded view of part of a shear coupling in accordance with an alternative embodiment of the disclosure.
Figure 7:
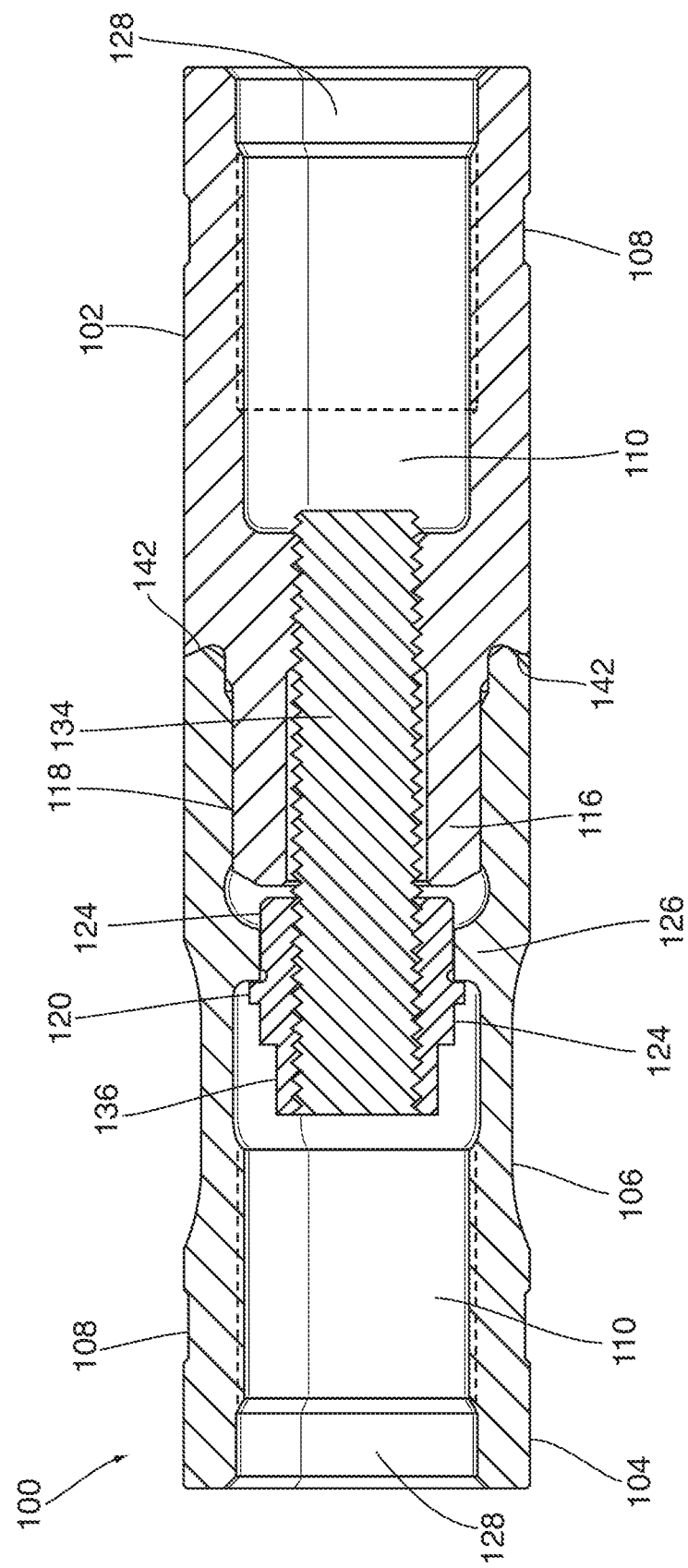
FIG. 7 is a side elevational cross-sectional view of a shear coupling assembled in accordance with the alternative embodiment of FIG. 6.

In an alternative embodiment, shown in FIGS. 6 and 7, the connecting member may comprise a threaded rod 134. In this embodiment, the shear nut body 124 may extend beyond the flange 120, with a portion 136 at one end of the shear nut 114 configured to receive a standard tool, such as a torque wrench, to tighten the shear nut 114, and to pretension the threaded rod 134. In this embodiment, most if not all of the axial bore of the shear nut 114 may be threaded to receive the rod 134.

Figure 8:
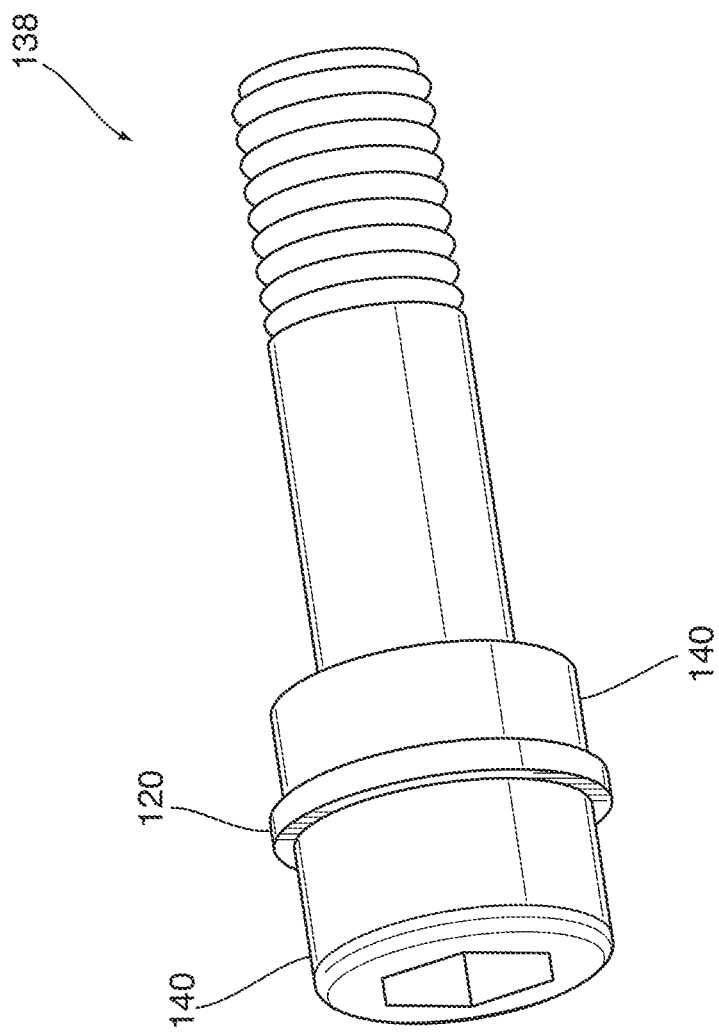
FIG. 8 is a perspective view of a one-piece connecting member and shear nut in accordance with an alternative embodiment of the disclosure.
Figure 9:
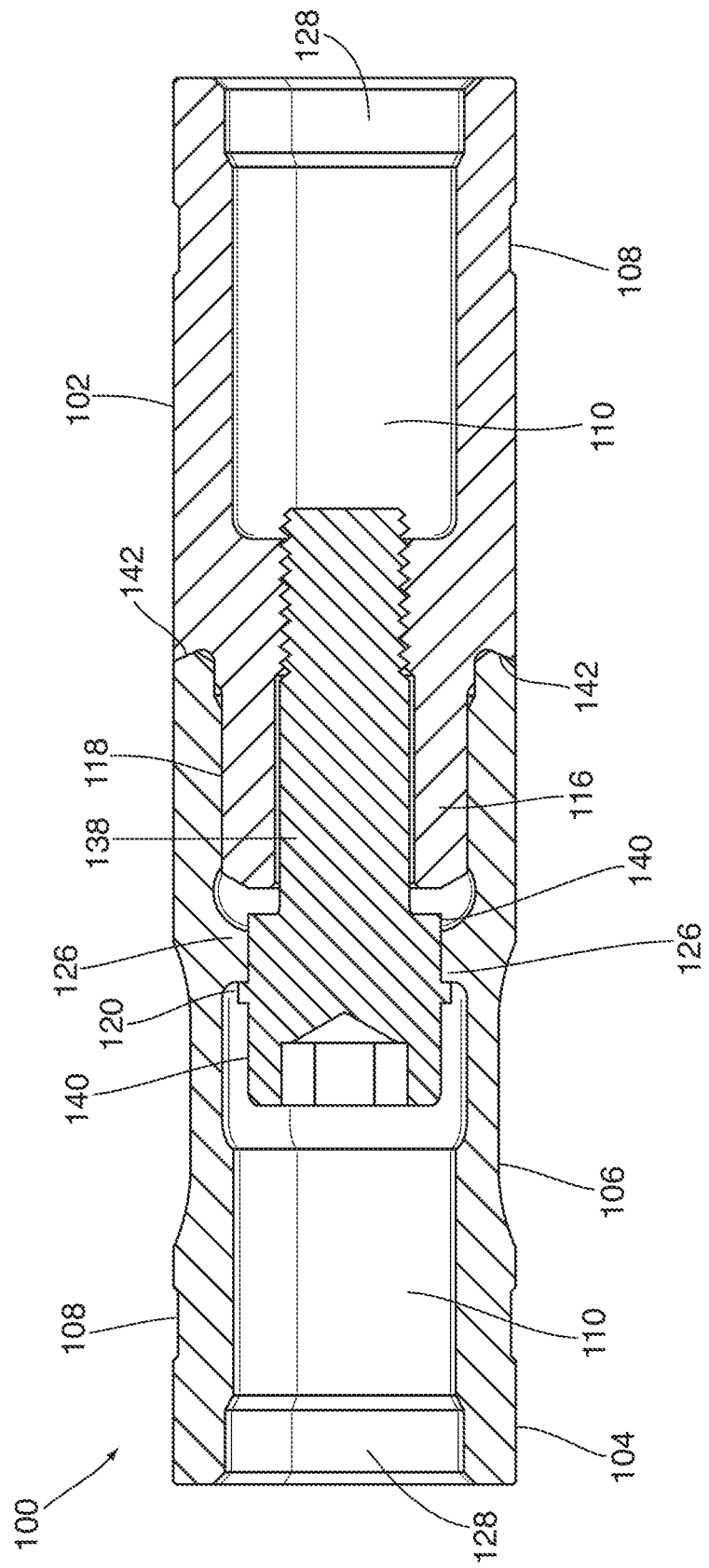
FIG. 9 is a side elevational cross-sectional view of a shear coupling assembled in accordance with the alternative embodiment of FIG. 8.

In a further alternative embodiment, shown in FIGS. 8 and 9, the connecting member and shear nut may be formed as a single piece 138. Like the preferred embodiment shown in FIGS. 1-5, the unitary connecting member and shear nut 138 has a flange 120 that is axially engaged with the shoulder 126 when the shear coupling 100 is assembled. However, in this embodiment, the shear nut body 124 and bolt head 130 are combined into a single body 140. The single body 140 is radially engaged with the shoulder 126, as shown in FIG. 9, thereby providing radial support to the unitary connecting member and shear nut 138.

Both of the alternative embodiments shown in FIGS. 6-9 would allow for a wider material selection for both the connecting member and the shear nut, which is advantageous for specific applications such as a high temperature environment.

In a further alternative embodiment, shown in FIGS. 10 and 11, the integral connecting member 144 may be formed as part of the coupling member 102. In this embodiment, the shear nut 114 may be formed in a manner similar to the embodiment shown in FIGS. 6 and 7. The integral connecting member 144 may be received within the axial bore 110 of the coupling member 104 when the coupling members 102 and 104 are driveable engaged. As seen in FIG. 11, the shear nut 114 is inserted into the axial bore 110 from the other end of the coupling member 104 until it is axially engaged with the shoulder 126 and radially engaged with the integral connecting member 144.

In a preferred embodiment, the shear nut 114 is made of 4130 HTSR or 4140 HTSR steel, although it may also be made of a softer steel. In this preferred embodiment, the dimensions of the shear nut 114 are as follows. The shear nut 114 has an overall axial length of about 0.59 to about 0.67 inches, with the flange 120 having an axial length of about 0.111 to about 0.185 inches, and the body 124 having an axial length of about 0.48 inches. The inner diameter of the flange 120 is about 0.78 inches, the inner diameter of the body 124 is about 0.656 inches, and the outer diameters of the body 124 and flange 120 are about 1.125 inches and about 1.25 inches, respectively.

When a user desires to separate the assembled shear coupling 100, an axial load at or above a pre-set amount may be applied to the shear coupling 100. The pre-set amount may be defined by the manufacturer of the shear coupling, and as the skilled person will appreciate, is dependent on the material properties and geometry of the shear nut 114, such as the axial thickness of the flange 120. When the pre-set axial load is applied to the shear coupling 100, the shear nut 114 shears through the flange 120, allowing the first coupling member 102 to separate from the second coupling member 104. When the shear nut 114 shears through the flange 120, at least a portion of the flange 120 may remain seated on the shoulder 126, while the rest of the shear nut 114 and connecting member pass through the axial bore 110 beyond the shoulder 126.

In an alternative embodiment (not shown), the shear nut 114 may comprise a nut and a separate shear washer. One axial side of the shear washer axially engages with the shoulder 126 at a radially outward point, and axially engages with the nut at a radially inward point, similar to the positioning of the flange 120 and the nut body 124 shown in FIG. 5. The other axial side of the shear washer axially engages with the bolt head 130. When a user desires to separate this embodiment of the assembled shear coupling 100, similar to the preferred embodiment, an axial load at or above a pre-set amount may be applied to the shear coupling, causing the shear washer to break. Without the nut, the shear washer may fatigue and cone due to the bending and torsional stresses experienced by the shear coupling 100 in use.

In one embodiment, after assembly of the shear coupling 100 but before it is put into use, the connecting member may be pretensioned. When the connecting member is pretensioned, it isolates the shear nut 114 from large alternating loads experienced by the shear coupling 100 in operation, which can cause premature fatigue failures of the shear nut 114. The use of a connecting member that can be axially stretched due to pretensioning allows for greater overall flexibility and resistance to bending stress for the shear coupling 100.

In a preferred embodiment, the length of the connecting member before pretensioning will be sufficient such that an axial end of the connecting member will extend into the axial bore 110 of the first coupling member 102 past the end of driving engagement member 116, as shown in FIG. 5. Alternatively, the connecting member may achieve this length due to stretching during pretensioning.

In an alternative embodiment where the orientation of the shear coupling 100 is flipped, the length of the connecting member will be sufficient such that an axial end of the connecting member will extend into the axial bore 110 of the second coupling member 104 past the end of driving engagement member 118, either before or after pretensioning.

Once the shear coupling 100 is assembled, the connection between the first coupling member 102 and the second coupling member 104 may provide a radial seal for the axial bore 110. This protects the axial bore 110, and the connecting member and shear nut 114 contained within the axial bore 110, from the corrosive wellbore environment. Although the axial ends 128 of the shear coupling 100 are open, they may also be sealed when the shear coupling 100 is connected to downhole components of a well string, as described below. Additionally, there may not be an axial bore through the entirety of the shear coupling 100, thereby partially isolating the connecting member and shear nut 114 from the wellbore environment.

In use, the shear coupling 100 may be used to connect downhole components of a well string, which the skilled person will appreciate can include a rod string, a tubing string, a downhole pump, etc. The shear coupling 100 is connected to these downhole components at the axial ends 128 of the first coupling member 102 and second coupling member 104. As shown in FIG. 5, ends 128 are axially opposed from the driving engagement members 116 and 118 of the coupling members 102 and 104. Ends 128 are configured to connect to downhole components in a conventional manner known to the skilled person, such as threading. Since the shear coupling 100 can handle being subjected to bending and torsional stress in use, it can be used in a well string with either a rotary pump, such as a progressive cavity pump, or a reciprocating pump.

The present disclosure also contemplates a method of assembly of a shear coupling 100. As a person of skill in the art will appreciate, there are a number of methods in which embodiments may be assembled. One preferred method of assembly is described below.

The first coupling member 102 is driveably connected to the second coupling member 104 by driveably engaging the male driving engagement member 116 formed in the first coupling member 102 with a matching female driving engagement member 118 formed in the second coupling member 104. The shear nut 114 and connecting member are inserted into the axial bore 110 until the shear nut 114 is axially engaged with the shoulder 126. The shear nut 114 and connecting member are operatively connected such that the shear nut 114 radially supports the connecting member. In some embodiments, the shear nut 114 and connecting member may be operatively connected together before insertion into the axial bore 110, and in other embodiments, the shear nut 114 and connecting member may be operatively connected together inside the axial bore 110. In the preferred embodiment, the shear nut 114 and bolt 112 are operatively connected such that the flange 120 is axially engaged with the bolt head 130. In an alternative embodiment show in FIGS. 6-7, the shear nut 114 is operatively connected to the threaded rod 134. In an alternative embodiment shown in FIGS. 8-9, the shear nut 114 and unitary connecting member and shear nut 138 are operatively connected by virtue of being formed together as a single piece. In an alternative embodiment shown in FIGS. 10-11, the shear nut 114 is operatively connected to the integral connecting member 144.

In the preferred embodiment, the bolt 112 may also be operatively connected to the axial bore 110 at connecting portion 132, or alternatively, operatively connected to the axial bore 110 in any other manner known to the skilled person such as with the use of another nut at the end of the bolt 112. In the preferred embodiment, the bolt 112 is threadedly connected to the connecting portion 132 and the shear nut 114. In alternative embodiments, the coupling members 102 and 104 may be operatively connected together as described above. Once the shear coupling 100 is assembled, the connecting member may be pretensioned as described above.

It will be appreciated that the order of completion of the method steps may be varied.

In one embodiment, before the coupling members 102 and 104 are connected, an antiseize coating may be applied to the driving engagement members 116 and 118 to reduce friction during assembly, and to ensure a smooth driving connection in use as well as a smooth disconnection upon the application of a pre-set axial load.

In another embodiment, the connection between the driving engagement members 116 and 118 may be a transition fit.

Although the invention has been described with reference to illustrative embodiments, it is to be understood that the invention is not limited to these precise embodiments. Numerous modifications, variations, and adaptations may be made to the particular embodiments of the invention described above without departing from the scope of the invention. The scope of the claims should not be limited by the preferred embodiments set forth in the examples, but should be given the broadest interpretation consistent with the description as a whole.

Immaterial modifications may be made to the embodiments described herein without departing from what is covered by the claims. The indefinite article "a" before a claim feature does not exclude more than one of the feature being present. Each of the individual features described here may be used in one or more embodiments and is not, by virtue only of being described here, to be construed as essential to all embodiments as defined by the claims.

The invention claimed is:

1. A shear coupling for connecting downhole components of a well string, the shear coupling comprising:
    first and second coupling members driveably engageable with each other, each of the coupling members having an axial bore formed therethrough, a shoulder being formed on the second coupling member within the axial bore, the axial bore of at least one of first and second coupling members having an internally threaded portion;
    a shear nut comprising a body having an axial bore formed therethrough, said body having a first end and a second end, said first end having a circumferential flange formed thereon that is axially engageable with the shoulder; and
    a threaded connecting member disposably receivable within the shear nut and the threaded portion of the axial bore of at least one of the first and second coupling members, the connecting member being radially supportable by the shear nut and the threaded portion of the axial bore and configurable to operatively connect the first and second coupling members.

2. The shear coupling of claim 1, wherein the shear nut has an overall axial length of about 0.59 to about 0.67 inches, said circumferential flange having an axial length of about 0.111 to about 0.185 inches, wherein said shear nut is configured to break upon the application of a pre-set axial load to the shear coupling.

3. The shear coupling of claim 2, wherein said body has an axial length of about 0.48 inches.

4. The shear coupling of claim 2, wherein said flange has an inner diameter of about 0.78 inches and an outer diameter of about 1.25 inches.

5. The shear coupling of claim 2, wherein said body has an inner diameter of about 0.656 inches and an outer diameter of about 1.125 inches.

6. The shear coupling of claim 1, wherein at least part of at least one of the first and second coupling members has a reduced cross-section formed on its outer surface.

7. The shear coupling of claim 1, wherein the driveable engagement between the first and second coupling members is a polygonal shaft profile on one of the coupling members and a matching polygonal hub profile on the other coupling member.

8. The shear coupling of claim 7, wherein the matching polygonal profiles are octagonal.

9. The shear coupling of claim 7, wherein an end of the connecting member is extendable into the axial bore beyond the length of the polygonal hub profile.

10. The shear coupling of claim 7, wherein an end of the connecting member is extendable into the axial bore beyond the length of the polygonal shaft profile.

11. The shear coupling of claim 1, wherein the well string comprises a reciprocating pump.

12. The shear coupling of claim 1, wherein the well string comprises a rotary pump.

13. The shear coupling of claim 1, wherein the connecting member is pretensioned.

14. The shear coupling of claim 1, wherein an engagement between the first and second coupling members provides a radial seal for the axial bore.

15. The shear coupling of claim 1, wherein the first and second coupling members each further comprise tapered shoulders that are engageable with each other when the coupling members are driveably engaged.

16. The shear coupling of claim 1, wherein said shear nut is internally threaded for supporting the threaded connecting member.

17. The shear coupling of claim 1, wherein said threaded connecting member is a threaded bolt.

18. A method of assembling a shear coupling comprising first and second coupling members, said first and second coupling members having an axial bore formed therethrough with a shoulder formed on the second coupling member within the axial bore, the axial bore of at least one of the first and second coupling members having an internally threaded portion, a threaded connecting member, and a shear nut comprising a body having an axial bore formed therethrough, said body having a first end and a second end, said first end having a circumferential flange formed thereon that is axially engageable with the shoulder, the method comprising the steps of:
    driveably connecting the first and second coupling members;
    inserting the connecting member and the shear nut into the axial bore formed through the first and second coupling members such that the flange of the shear nut is axially engaged with the shoulder formed within the axial bore and radially supporting the connecting member; and
    operatively connecting the coupling members together.

19. The method of claim 18, further comprising the step of pretensioning the connecting member.

20. The method of claim 18, wherein the driveable connection between the first and second coupling members provides a radial seal for the axial bore.

21. The method of claim 18, wherein the first and second coupling members are driveably connected with a transition fit.

22. The method of claim 18, wherein the first and second coupling members each further comprise tapered shoulders that are engaged with each other when the coupling members are driveably connected.

* * * * *